LOGIC CIRCUITS

"PRIOR ART"

"PRIOR ART"

INVENTORS
STATHIS G. LINARDOS
RICHARD M. ELMHURST
WILLIAM A. ELMHURST

BY Dominik & Stein

ATTORNEYS

INVENTORS
STATHIS G. LINARDOS
RICHARD F. ELMHURST
WILLIAM A. ELMHURST

BY Dominik & Stein
ATTORNEYS

United States Patent Office 3,428,824

Patented Feb. 18, 1969

3,428,824

LOGIC CIRCUITS

Stathis G. Linardos and Richard F. Elmhurst, Clearwater, and William A. Elmhurst, Largo, Fla., assignors to Lykes Bros., Inc., Tampa, Fla., a corporation of Florida Filed Aug. 26, 1965, Ser. No. 482,737
U.S. Cl. 307—215 3 Claims
Int. Cl. H03k *19/34, 19/36*

ABSTRACT OF THE DISCLOSURE

A logic circuit for permitting the use of both NAND and NOR gates for implementing products of sums and sums of products functions within the same logic system, whether positive or negative logic is used throughout the logic system, in a manner such as to minimize the required logic and to thereby provide a substantial reduction in required hardware in comparison to those logic systems using only NAND gates or NOR gates.

This invention relates to logic circuits and more particularly to NOR gates which are capable of being used in conjunction with NAND gates, flip flop circuits or any other type of circuit within a given digital system, to provide significantly greater degrees of design flexibility and hardware reduction in implementing a logic system.

In the field of automation, in particular, a large percentage of a system is made up of gating circuits, such as NOR gates and NAND gates. The present invention is particularly applicable in systems such as these, to provide design flexibility in implementing the logic and to provide a considerable savings in the "hardware" required. However, it is equally applicable in numerous other types of systems and different applications.

With presently available NOR gate circuit designs, it is found that the output up level of the driving circuit is clamped by the summation of voltage drops across the NOR gate's input diodes and the base to emitter junction of the gate's transistor. The circuit driving the NOR gate is therefore incapable of providing identical information to various combinations of logic circuits such as flip flop, single shots, gates, etc. In addition, system checkout is complicated by the fact that logic levels are not standard throughout the system.

Also it can be shown that in general, NAND logic gates are most easily and economically used to implement logic expressions which are in a sum of product form (e.g. $AB+CD+EFG$ . . .); conversely, NOR logic gates are most easily and economically used to implement logic expression which are in a product of sum form (e.g. $(A+B+C)(D+E)(F+G)$ . . .). When NAND logic gates are used to implement a product of sums logic expression, or NOR logic gates are used to implement sum of product, logic expressions inefficiencies occur. The present state of the art requires a logic system designer to implement logic hardware using all NAND logic gates or all NOR logic gates since the available NOR circuits are not compatible with the available NAND logic gates. A logic system designer must therefore transform the Boolean logic expressions to a form applicable to either NAND or NOR implementation which may result in less than minimal implementation [it should be noted that all logic expressions can be represented in either product of sums or sum of products form and, as is demonstrated hereinafter, it is advantageous to be able to choose one or the other forms for implementation—e.g. $(A+B)(C+D)=AC+BC+BD+AD$]. In practice it is found that implementation of both sum of products and product of sums logic expressions are rekuired in a given logic system; thus, considerable inefficiencies are present within a system that is restricted to all NAND gates or all NOR gates.

It is therefore an object of the present invention to provide improved logic systems.

It is a further object of the present invention to provide an improved NOR gate circuit.

It is a still further object of the present invention to provide an improved NOR gate circuit which is capable of being used with NAND and NOR gate circuits, flip flop circuits and any other type of circuit within a given digital system, to provide greater degrees of design flexibility in implementing a logic system. In this respect, it is contemplated that considerable savings in "hardware" is provided.

It is a still further object of the present invention to provide NAND-NOR compatible circuits, whereby a logic circuit designer is not limited to implementing a logic system using all NAND gate circuits or all NOR gate circuits, but can freely alternate between NAND and NOR implementation.

It is a still further object of the present invention to provide NAND-NOR compatible circuits, whereby a logic circuit designer is free to choose a completely positive or a completely negative logic system and still perform NAND and NOR operations within one system.

Other objects of the invention will in part be obvious and will in part appear hereinafter.

Briefly, the above objectives are accomplished, according to the present invention, by providing a NOR logic circuit having isolation capability, whereby the up-level of a driving circuit is not clamped, as in the case of presently available NOR logic circuits.

For a fuller understanding of the nature and objects of the invention, reference should be made to the following detailed description taken in connection with the accompanying drawings, in which.

Figure 8:
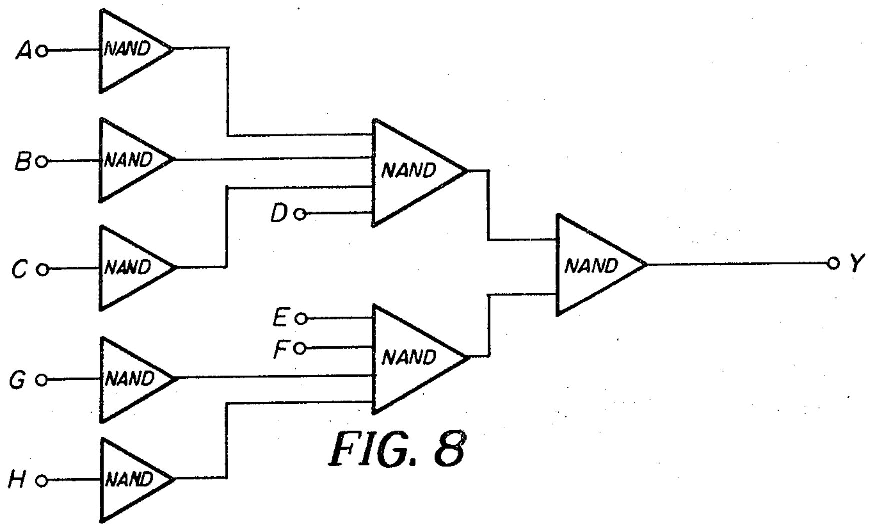
Figure 9:
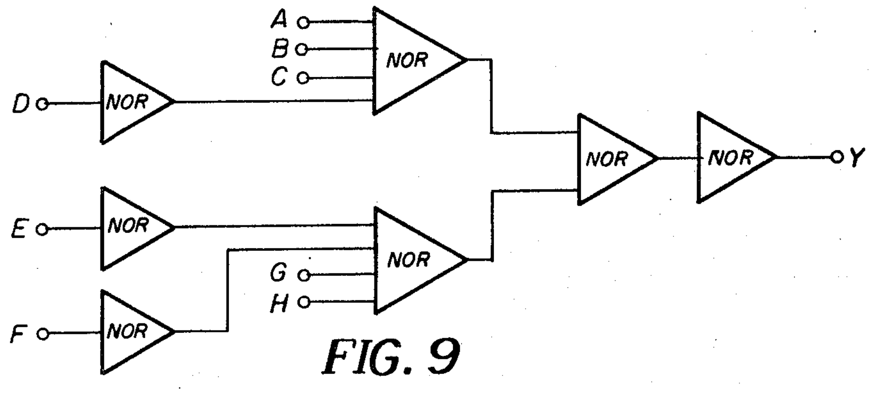

using NOR logic and NAND logic, respectively;

FIGURES 8 and 9 are block diagram logic circuits for implementing the function $$Y=\overline{(A+B+C)D}+EH\overline{(G+H)}$$

using NAND logic and NOR logic, respectively; and

Figure 10:
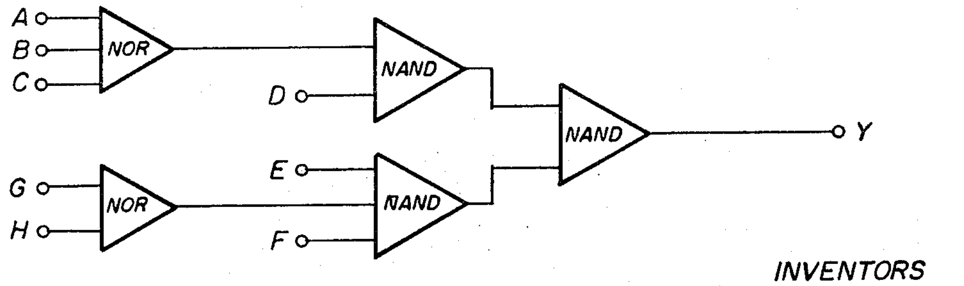

FIGURE 10 is a block diagram logic circuit for implementing the same function, using NAND-NOR compatible logic circuits of the present invention.

Figure 1:
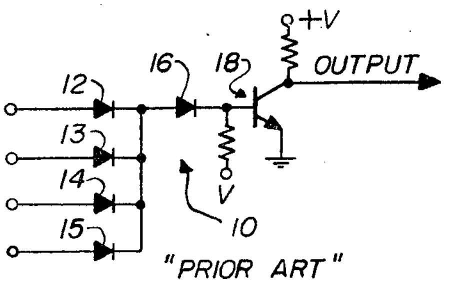
FIGURE 1 is a NOR gate exemplary of the prior art.

Referring now to the drawings, in FIG. 1 there is shown a NOR gate 10 which is representative of those presently available and generally used in logic circuits for computers, automation systems and the like. When driving the NOR gate 10 with logic circuits such as a flip flop, NOR gate, inverters or drivers, it is found that the output up level of the driving circuit is clamped by the summation of voltage drops across diodes 12–16 and the base to emitter junction of the transistor 18. A driving circuit for the NOR gate 10 is therefore rendered incapable of providing identical voltage level information to NAND gates, flip flop circuits and the like, and the flexibility of a system is therefore greatly restricted.

Figure 2:
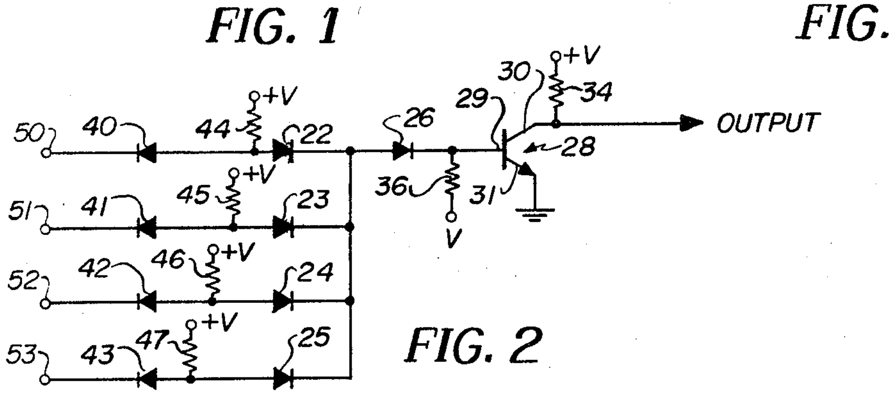
FIGURE 2 is a NOR gate exemplary of the present invention.

In FIG. 2 there is shown a NOR gate 20 exemplary of the present invention which overcomes the above limitations of presently available NOR gates, and permits a substantial reduction in the "hardware" required in logic circuits. The NOR gate 20 includes diodes 22–25, the cathodes of which are each connected to the anode of a diode 26. The cathode of diode 26 is connected to the base 29 of a transistor 28. The collector 30 of transistor 28 is connected through a resistor 34 to a positive voltage and its emitter 31 is connected directly to ground. The output of the NOR gate 20 is taken at the junction between the colletcor 30 and the resistor 34. A resistor 36 has one terminal connected to the base 29 of transistor 28 and its other terminal connected to either ground, a negative voltage or may be eliminated, depending upon the leakage of transistor 28. In this respect, the NOR gate 20 corresponds to the circuit configuration of the NOR gate 10.

The NOR gate 20 is improved to provide the advantages described hereinafter, by connecting to the anode of each of the diodes 22–25 the anode of another diode and by connecting one terminal of a resistor to the junction between them, such as, for example, the diode 40 and resistor 44 connected to the anode of diode 22. The other terminal of each of the resistors is connected to a positive voltage. The outputs of the driving circuits are connected to the cathodes of the respective diodes 40–43. It will be noted that inputs in addition to the inputs 50–53 can be coupled to the NOR gate 20, and only inputs 50–53 are shown to illustrate the invention.

As an example of the operation of NOR gate 20, assume a "1" is a positive potential with respect to ground, while "0" is ground potential. A positive potential at any one of the inputs 50–53 will reverse bias the respective diode 40–43, allowing current to flow through the respetcive resistors 44–47 to the base 29 of the transistor 28. Transistor 28 is thereby rendered conductive, causing current to flow through resistor 34, collector 30 and emitter 31 of transistor 28, to ground. The output will therefore appear at approximately ground potential.

It can be seen that the diode-resistor combinations (e.g. diode 40 and resistor 44) provide isolation between the driving circuits and the NOR gate 20 so that it is now possible to operate the NOR gate 20 with other circuits within a given system, because the up-level of the driving circuits is not clamped as in the case of the NOR gate 10.

While the NOR gate 20 provides an improvement in NOR gate designs, it also provides numerous advantages in logic system designs. For example, with the NOR gate 20, it is possible to perform the NAND and NOR logic functions within the same logic system, whether the system is implemented in positive logic or negative logic. Design flexibility is therefore provided by use of the NOR gate 20, by virtue of the completely compatible NAND-NOR system which is provided.

As explained more fully below, by virtue of the completely compatible NAND-NOR system which is provided, a considerable reduction in the "hardware," that is, the elements comprising a logic system, is realized, when compared to a logic system implemented using a purely NAND system or a purely NOR system.

Figure 3:
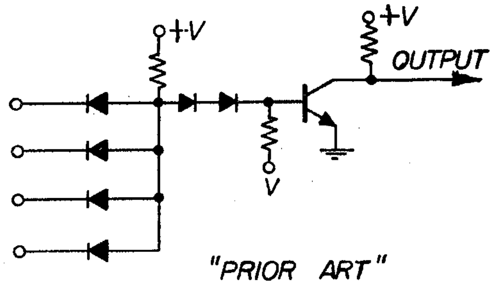
FIGURE 3 is a NAND gate exemplary of the prior art.

In FIG. 3 there is shown a NAND gate 60 typical of the prior art. In the description which follows, the NAND gate 60 is used as the basis for comparison.

Figure 4:
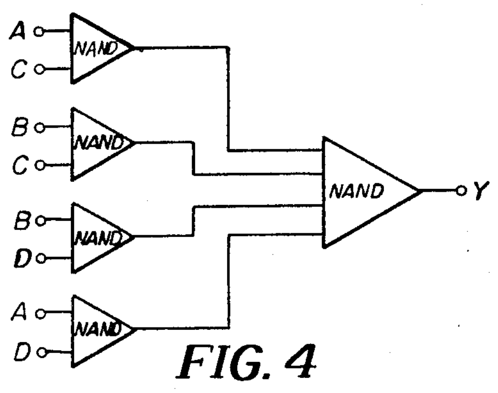
FIGURES 4 and 5 are block diagram logic circuits for implementing the function $Y=AC+BC+BD+AD$, using NAND logic and NOR logic, respectively.

In FIG. 4 the logic circuitry required to implement the logic function $Y=AC+BC+BD+AD$, using NAND gates, is shown in block diagram. It may be noted that five NAND gates are required.

Figure 5:
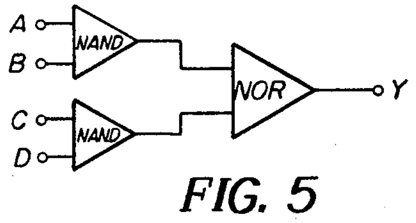

In FIG. 5 the logic circuitry required to implement the same logic function, using NOR gates, is shown in block diagram. In this case it may be noted that three NOR gates of the type shown in FIGURE 2 are required to implement the logic function. It may further be noted that this is done without clamping the input voltage levels and, because of this, the circuit can be used in conjunction with other logic gates.

The following table illustrates the number of diodes, resistors and transistors which are required in the design of the logic circuits of FIGS. 4 and 5, having 1–4 inputs, as required to perform the function $$Y=AC+BC+BD+AD$$

| | Diodes | Resistors | Transistors |
|---|---|---|---|
| NAND (Fig. 4): | | | |
| 1 input | 3 | 3 | 1 |
| 2 inputs | 4 | 3 | 1 |
| 3 inputs | 5 | 3 | 1 |
| 4 inputs | 6 | 3 | 1 |
| NOR (Fig. 5): | | | |
| 1 input | 3 | 3 | 1 |
| 2 inputs | 5 | 4 | 1 |
| 3 inputs | 7 | 5 | 1 |
| 4 inputs | 9 | 6 | 1 |

The component count for each of the circuits of FIGS. 4 and 5 is therefore as follows:

| | Diodes | Resistors | Transistors |
|---|---|---|---|
| NAND (Fig. 4) | 22 | 15 | 5 |
| NOR (Fig. 5) | 15 | 12 | 3 |

From the above comparison, it is demonstrated that a savings in terms of the required number of components is effected when the logic designer has the flexibility of implementing with either NAND logic gates or NOR logic gates within a given system. The principal reason that one saves with NOR logic gates over NAND logic gates in this example is due to the fact that the equivalent product of sums expression contains fewer terms (4 terms) than the equivalent sum of products expression (8 terms) $Y=(A+B)(C+D)=AC+BC+BD+AD$. The opposite case is demonstrated in the following example.

Figure 6:
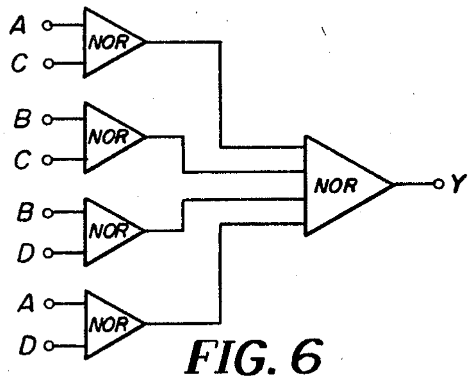
FIGURES 6 and 7 are block diagram logic circuits for implementing the function $$Y=(A+C)(B+C)(A+D)(B+D)$$
Figure 7:
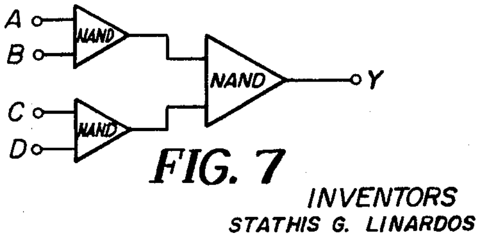

In FIGS. 6 and 7, the logic circuitry required to implement the logic function $$Y=(A+C)(B+C)(A+D)(B+D)$$

is illustrated using NAND logic and NOR logic, respectively. It may be noted that three NAND gates are required, or five NOR gates. The component count for each of these circuits is therefore as follows:

| | Diodes | Resistors | Transistors |
|---|---|---|---|
| NOR (Fig. 6) | 29 | 22 | 5 |
| NAND (Fig. 7) | 12 | 9 | 3 |

In this case, it is apparent that implementation with NAND logic gates provide considerable savings over NOR logic gates. This is due to the equivalent sum of products expression requiring fewer terms (4 terms) than the equivalent product of sums expression (8 terms)

$$Y=AB+CD=(A+C)(B+C)(B+D)(A+D)$$

The above two examples are typical of logic implementation in automation systems.

As indicated above, the present state of the art requires a designer to implement a system with all NAND logic gates or all NOR logic gates. Since inefficiencies occur and extra components are required when NAND logic gates or NOR logic gates is used to implement a form of a logic expression for which it does not favor, it would be advantageous to be able to freely choose to implement with either NAND or NOR logic gates within a particular system. The NOR gate 20 can drive and be driven by NAND gates in addition to the other logic circuits without the up level being clamped. Because of this, the logic designer can freely choose to implement logic expressions with NAND or NOR gates within a particular system depending on the form of the logic expression. Because of this flexibility, logic systems can be implemented with a substantial savings over a completely NAND system or a completely NOR system.

The following example clearly demonstrates the above described advantages. In FIG. 8, the logic function $$Y=\overline{(A+B+C)}D+EH\overline{(G+H)}=\overline{A}\overline{B}\overline{C}D+EF\overline{G}\overline{H}$$

is implemented using NAND logic. In FIG. 9, the same function is implemented using NOR logic. In FIGS. 8 and 9, it may be noted that eight NAND gates and seven NOR gates are required.

In FIG. 10, the same function is again implemented using the NAND-NOR compatible logic circuitry provided by the present invention. In this case it may be observed that two NOR gates and three NAND gates are required.

The following table is a comparison of the number of components required in the circuit of FIG. 8 using the NAND gate of FIG. 3, the circuit of FIG. 9 using the NOR gate of FIG. 1 and the circuit of FIG. 10 using the NAND gate of FIG. 3 and the NOR gate of FIG. 2.

| | Diode | Resistors | Transistors |
|---|---|---|---|
| NAND (Fig. 8) | 31 | 24 | 8 |
| NOR (Fig. 9) | 35 | 28 | 7 |
| NAND-NOR (Fig. 10) | 25 | 18 | 5 |

It is clearly demonstrated that substantial hardware is saved implementing with NOR gate 20 of the disclosed invention. In the first two examples hardware savings is illustrated when one has the flexibility of alternating between the use of NAND gates and NOR gates when implementing a logic system. In some cases, minimum implementation is accomplished with NAND gates and in other cases minimum implementation is accomplished with NOR gates. NOR gate 20 of the disclosed invention provides the designer this flexibility by virtue of voltage levels not being clamped at the NOR gate inputs. The third example illustrates the savings when one is able to implement a single Boolean expression using both NAND and NOR gates of the present invention.

It is apparent from the above description that the NOR gate of the present invention does not clamp the up level of the driving circuits used in conjunction with them, as in the case of those presently available. It is therefore possible to now operate a NOR gate in conjunction with other logic circuits within a given logic system, such as for example, with NAND logic circuits, whether the logic system is implemented using positive logic, or negative logic.

In this latter respect, the NAND-NOR compatible circuits provided by the present invention always provide significant degrees of design flexibility since a logic system designer is no longer restricted to implementing a logic system using all NAND gates or all NOR gates but can freely alternate between them, depending upon the requirements of the system or the designer's preference. Furthermore, the designer is free to choose a completely positive or a completely negative logic system, and still perform NAND and NOR operations within one system, without sacrificing efficiency and without using unnecessary "hardware."

A further degree of design flexibility is provided by the present invention, in that all Boolean expressions can be implemented directly without the necessity of transforming them to a less than minimal form. For example, depending on whether the Boolean expression is in the form of sum of products or product of sums, the logic circuit designer can merely choose either NAND gates or NOR gates, or both, depending only upon his technique of implementing logic. With the NOR gates and other logic gates of the prior art, the logic system designer of necessity had to transform the Boolean expressions to forms applicable to either the NAND or NOR logic implementation.

In addition to providing the logic system designer with greater degrees of flexibility in designing the logic system, it is clearly demonstrated that a significant savings in the "hardware" required within a given system is provided, by using the compatible NAND-NOR circuitry of the present invention.

In each of the above described examples, the assumption is made that only plain variables (A, B, C, etc.) are available for implementation and that "not" variables ($\overline{A}$, $\overline{B}$, $\overline{C}$, etc.) are not available. This is a valid assumption since only the plain or the "not" variable is available not both, except in cases where variables are taken from flip flop circuits. It will be apparent to those skilled in the art, that the present invention is equally applicable in systems where only "not" variables are available.

Referring again to FIG. 1, the transistor 18 of the NOR gate 10 is illustrated as an NPN transistor. As it is well known to those skilled in the art, a PNP transistor can be substituted for the NPN transistor 18, however, the polarity of the diodes 12–16 must be reversed in order to retain the same function. The same is true with respect to the NOR gate 20. The NPN transistor 28 can be replaced with a PNP transistor, and the polarity of the diodes reversed. That is, the cathodes of the diodes 22–25 are connected to the cathodes of the diodes 40–43, and the cathode of the diode 26 connected to the anodes of the diodes 22–25. Therefore, by changing the circuitry in the appropriate manner, either PNP or NPN transistors can be used in the NOR gate 20.

Referring to FIG. 2, the values of the components of the NOR gate 20 corresponding to those of the NOR gate 10 are determined and are selected, in the well known manner. The value of the resistors 44–47 is dependent upon the repetition rate desired within the logic system, and is determined by the particular transistor used (i.e. transistor 30) and its storage time. When the latter is determined, resistors 44–47 are correspondingly selected to provide the desired repetition rate. In a particular application, in a logic system having a 1.0 mc. pulse repetition rate, the following component values provided satisfactory operation for the NOR gate 20 within the system.

| | |
|---|---|
| Transistor **30** | Fairchild 2N3646. |
| Diodes **22–26** and **40–43** | FD 6666. |
| Resistor **34** | 1.0K ohms. |
| Resistor **36** | 18.0K ohms. |
| Resistors **44–47** | 2.7K ohms. |

Additional advantages which are provided by the present invention included cost, size, weight, space and reliability for a particular logic system. Also, since the NAND gate of FIGURE 3 and the NOR gate 20 of the present disclosure are completely compatible, within any logic system whether implemented in positive logic or negative logic, the NAND and NOR circuits can be provided in module forms which are easily and quickly included within the logic system. By the same token, being in module form they are easily replaced.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. In a logic system, a logic circuit for permitting the use of both NAND and NOR gates for implementing product of sums and sums of products functions within the same logic system, whether positive or negative logic is used throughout the logic system, in a manner such as to minimize the required logic and to thereby provide a substantial reduction in required hardware in comparison to those logic systems using only NAND gates or NOR gates, said logic circuit comprising output means; a rectifier coupled to said output means; a plurality of input circuits, each of said input circuits being coupled to said rectifier and including a rectifier coupled to said rectifier coupled to said output means and isolation means for isolating said logic circuit from driving circuits coupled to said input circuits, said isolation means each comprising a rectifier and a resistor, said rectifier being coupled to a driving circuit and to said rectifier included in said input circuit and said resistor being coupled to the junction between said last-mentioned pair of rectifiers and to a source of potential.

2. The logic circuit of claim 1, wherein said output means comprises a transistor.

3. The logic circuit of claim 1, wherein said rectifier coupled to said output means and said rectifier included in each of said input circuits are coupled to one another to conduct current in the same direction, and wherein said rectifier included in each of said input circuits and said rectifier included in the associated one of said isolation means are coupled to one another to conduct current in opposite directions.

References Cited

Motorola Pamphlet, "Customline Diode Transistor Logic Integrated Circuits," #4249, January 1964 (cover page and p. 9).

ARTHUR GAUSS, *Primary Examiner.*

DONALD D. FORRER, *Assistant Examiner.*

U.S. Cl. X.R.

307—218